Dec. 31, 1968  K. MAURER  3,419,878
RECORDER WITH REVERSIBLE PEN DRIVE
Filed May 10, 1967  Sheet 1 of 2
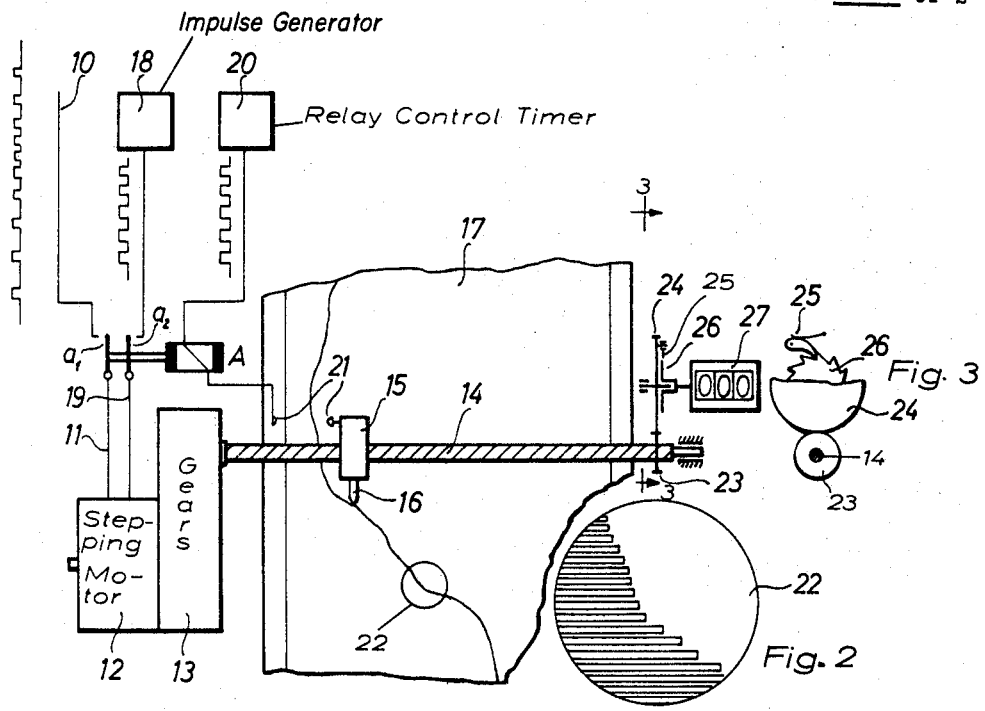
Fig. 1
Fig. 2
Fig. 3
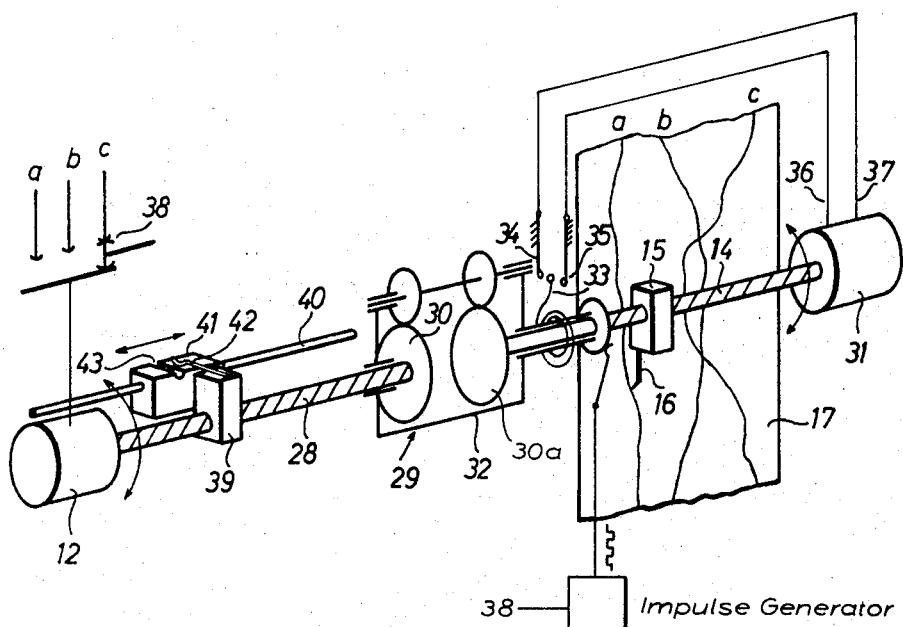
Fig. 4
INVENTOR.
KLEMENS MAURER
BY
Darbo, Robertson &
Vandenburgh

United States Patent Office

3,419,878
Patented Dec. 31, 1968

3,419,878
RECORDER WITH REVERSIBLE PEN DRIVE
Klemens Maurer, Solingen, Germany, assignor to Sunvic-Regler GmbH, Solingen-Wald, Germany
Filed May 10, 1967, Ser. No. 637,379
Claims priority, application Austria, May 27, 1966,
A 5,042
9 Claims. (Cl. 346—14)

ABSTRACT OF THE DISCLOSURE

An indicating or recording device has an indicating or pen member movable by a drive whose direction of rotation can be reversed by a timer and wherein the measured input values in the form of an impulse sequence are applied to a stepping motor, and the indicating or pen member is moved as a function of the movement of the stepping motor. The drive for the indicating member is through a threaded spindle. In one form the spindle is connected to a counter through a one-way clutch so as to integrate the input pulses. In another variation the input comprises a second stepping motor connected to a differential, to which differential the threaded spindle is connected so that an error signal can be obtained from the differential.

Background of the invention

Indicating or recording devices, wherein a compensation voltage is connected in opposition to an analog input voltage and a servo motor is operable by the voltage difference are well known. This servo motor adjusts both an indicating or pen member and, at the same time, a potentiometer to obtain the compensating voltage. By the adjustment of the potentiometer, a feedback is produced in an analog servo loop. It has already been proposed to use a stepping motor as servo motor in such or similar assemblies. The measured variable appears therein, at any rate, in analog form and an analog feedback is produced.

Furthermore, it is well known, to transmit a measured variable in digital form, either as an impulse frequency proportional to the measured variable, or as an impulse telegram. The information transmitted has, up to now, usually been indicated or recorded in digital form.

Furthermore, a device for periodically recording measured variable of the maximum recorder type is known (German patent publication 1,195,501), wherein measured variables in the form of electric measuring impulses are fed continuously to a stepping motor. A pen member is mounted non-rotatably and guided on a threaded spindle. The spindle is driven by a torque amplifying reversible motor, so that the pen is moved across a chart along the spindle in proportion to the rotation of the reversible motor. The stepping motor rotates a stop through a differential gear. The movement of the reversible motor is limited by said stop when a pawl coupled with the reversible motor abuts the stop. When the stop is moved by the stepping motor, the pawl is released. The reversible motor starts, and on the one hand, moves the spindle with the pen member, and, on the other hand, turns back the stop through the second input of the differential gear, whereby the pawl again abuts the stop after half a revolution or, with large deflections after a number of half revolutions. The travel of rotation of the reversible motor is then in a fixed relation to the rotation of the stepping motor. After a certain time, the reversible motor is reversed, a ratchet gear between reversible motor and differential gear yielding and a locking mechanism being provided in the differential gear, so that the sun gear of the differential gear on the side of the reversible motor is held stationary during the return travel of the reversible motor. Thus the return travel of the reversible motor does not become effective on the differential gear. The measuring impulses continuing to be received during the return time of the reversible motor cause a rotation of the stop and, thereby, are stored until to the next advance travel of the reversible motor. This assembly is as complex as possible. It is a technically awkward solution to brake a motor by a stop.

It is the object of this invention to provide a recorder operating with auxiliary force, which is adapted to record digital information in quasi-analog form, thereby combining the advantages of digital data processing, such as avoiding feedbacks and ease of remote transmission, with those of the analog data recording, such as facility of inspection.

It is another object of the invention to provide a recorder of simple design with no feedback from pen travel to input.

Description of the drawings

FIG. 1 illustrates a recording device of the invention with an integrating counter;
FIG. 2 is an enlargement of the graph record;
FIG. 3 is a partial section as seen at line 3—3 of FIG. 1;
FIG. 4 shows a modification of the assembly of FIG. 1 including alarm signal generator, measuring point selector and storing of the measured variable value during the detection of the next following value.

Figure 5:
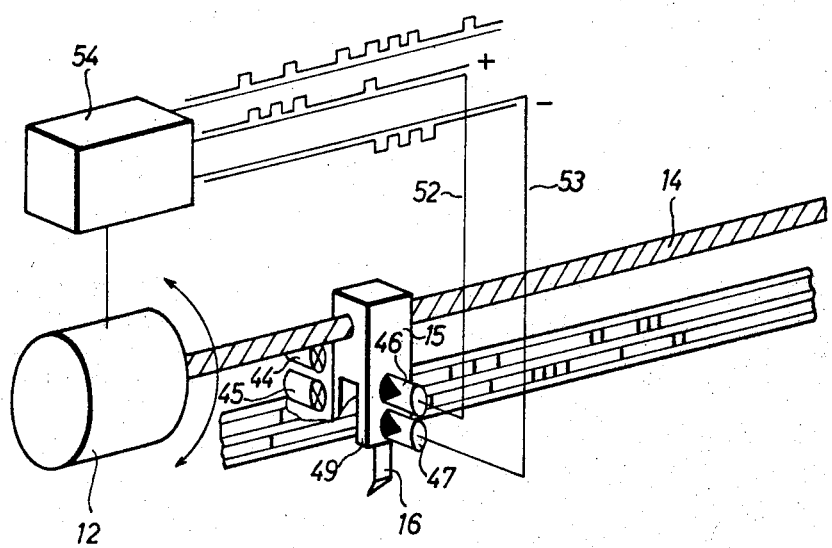
FIG. 5 shows a modification of the arrangement of FIG. 1 with means for producing correcting impulses.

Description of the invention and the preferred embodiments

Starting from a device of the type defined initially, the invention is characterized in that the stepping motor is disconnected from the measuring impulse input directly by the timer after a predetermined time interval, and a return impulse generator is provided to which the stepping motor is connected by the timer for returning the motor into its initial position.

Thus the information is received by the indicating or recording device directly in digital form without preceding digital to analog conversion, and causes a corresponding number of steps of the stepping motor. The stepping motor displaces an indicating or pen member through a number of travel increments corresponding to the number of impulses received. Though the displacement of the indicating or pen member is effected in steps, thus in digital form, a quasi-analog or analog-like indication or recording with the advantages of analogly operating apparatus is achieved, as the steps or travel increments can be made sufficiently small by appropriate design. Of course, it is not sufficient to apply the information received, for example, as an impulse frequency, infinitely to the stepping motor. Rather the impulses are applied to the measuring impulse input of the stepping motor only for a limited, well defined time interval, in accordance with a further feature of this invention. During this time interval, a number of impulses corresponding to the measured variable is received and causes a corresponding deflection of the indicating or pen member. Thereafter the stepping motor is returned to the initial position, and the measured variable, which may have changed in the meantime, is again applied in impulse form in the same manner. Thus the indication or recording, respectively, is effected intermittently.

The invention is reduced to practice, for example, in that the motor drives a threaded spindle, on which a non-rotatably guided indicating or recording member is mounted. A counter is coupled with the spindle through a clutch device operating in one direction of rotation only. Such a counter sums up the advancing steps and, thereby, provides an integration of the measured variable or a planimetering of the graph recorded.

To make provision that the indication does not cease, during the return movement of the stepping motor into its initial position and the subsequent advancing steps into the position corresponding to the new measured variable, nor the graph is interrupted, the arrangement may be such that a differential having two inputs and one output is provided. The first input of the differential is connected with the stepping motor and the second input is conected with a threaded output spindle. A non-rotatably guided indicating or pen member is mounted on the spindle. An error signal is derived through the output and includes a contact device. Through the contact device a stepping motor, coupled to the output spindle, is connected to an impulse generator for advancing or returning rotation upon receipt of the error signal from a position of rest, so that the spindle is rotated to follow the first input shaft. Subsequently, as determined by the timer, the stepping motor coupled with the output spindle is disconnected from the impulse generator and the stepping motor connected with the first input shaft is connected first with the return impulse generator and subsequently again for the predetermined time interval with the measuring impulse input.

In such a device, therefore, the output spindle with the indicating or pen member remains in the last set position, while the stepping motor returns the first input shaft into its initial position and thereafter gets a new number of impulses to set it on the now present measured variable, which may be slightly different from the previous one. During all this time the previous indication has been maintained. Now the output spindle is rotated through the contact device to follow the new setting of the first input shaft of the planet gear. The indicating or pen member has to make a travel only corresponding to the difference of the measured variable values.

Thus an indication is permanently available in an indicating device, this indication being corrected cyclically. In a recording device, a measured variable is permanently recorded, and the pen member is moved only in accordance with the measured variable increments. This can be expressed in a different way: it is necessary that each measured variable value is indicated or recorded at least for a certain time interval. The arrangement described makes it possible to utilize this indication or recording time interval, to detect, in the meantime, the next digital measured variable value by means of the stepping motor. Thus the maximum possible detection frequency is increased.

In this way, the variation with time of a single measured variable may be detected. Of course, a plurality of measuring points may be applied cyclically to the measuring impulse input by means of a selector switch.

The arrangement may be made such that the first input shaft is coupled to a first stepping motor and the output spindle to a second one, the second stepping motor being switched off after the spindle has followed up the movement of the first motor. As, however, the stepping motors run alternatingly only, one single stepping motor may be sufficient, said stepping motor being coupled alternatingly with the first input shaft of the planet gear or with the spindle.

The first input shaft of the differential may be formed as a second spindle on which a non-rotatably guided carriage is mounted. An alarm signal generator is arranged adjacent the second spindle to be actuated by the position of the latter carriage. Such an alarm signal generator responds, when the measured variable exceeds a predetermined value and the carriage is, therefore, moved into the range of the alarm signal generator.

The alarm signal generator may actuate an optical or accoustic signalling device. It may, however, also effect a switching of process conditions, of the measuring range or the like.

In order to set the limit value at which the alarm signal is to be given, the arrangement may be such that the alarm signal generator is movably guided along the input spindle, and that an electromagnetically actuated entrainment means for moving the alarm signal generator is provided on the carriage. Thus the carriage may be moved by impulses to the place of the alarm signal generator. Then the entrainment means is actuated to couple the alarm signal generator to the carriage. By further impulses the carriage and alarm signal generator can be moved altogether into a new position. Then the entrainment means is again released so that the alarm signal generator remains in its new position.

Often it is necessary to modify the indication of a measured variable $x$ in accordance with a certain function $f(x)$, for example, in order to achieve a linearization or to obtain an indication of rate of flow from the pressure difference across a restrictor. Thus $x$ impulses are applied to the measured impulse input by the measured variable pick-up during each detection interval. The indicating or pen member should, however, be deflected through $f(x)$ increments.

This can be achieved in that a track with marks is provided along the path of the pen member, and that a pick-up head for scanning these marks is connected with the pen member to apply a correcting impulse to the measuring impulse input upon detection of each such mark. If, for example, 50 impulses are produced by the measured variable pick-up, $f(x)$ being, however, equal to 60, provision must be made to have 10 marks on the path travelled by the pen member, which marks produce the remaining impulses.

Advantageously, two tracks and pick-up heads are provided, one track producing additive and the other track subtractive correcting impulses.

In the embodiment of FIG. 1 the measured variable is transmitted digitally in the form of impulses on a line 10 (measuring impulse input). The impulses pass through a normally closed contact $a_1$ of a switching relay to the forward input 11 of a stepping motor 12. The stepping motor 12 drives a threaded spindle 14 through a gearing 13. A carriage 15 with a pen 16 (indicating or pen member) is mounted on spindle 14. The carriage 15 is guided non-rotatably, in a manner not shown, along the spindle 14 and engages the threads thereof. The spindle and carriage form a transversing means for the pen. When the spindle rotates, the carriage 15 and the pen 16 are moved transversely across a strip chart 17. As viewed in FIG. 1, chart 17 would be traveling vertically. A return impulse generator 18 produces electrical impulses and can be connected to the "backward" input 19 of stepping motor 12 through a contact $a_2$ of relay A. The relay A is controlled by a timer 20 and a limit switch 21. The limit switch is actuated, when the stepping motor 12 has returned the carriage 15 into its left initial position. The measuring impulses are applied to the forward input 11 of the stepping motor 12 during a given detection time. During that time carriage 15 with the pen 16 is moved step-by-step into a position corresponding to the measured variable value signified by the measuring impulses. The detection time is determined by the timer 20. Following the detection time the relay returns to its central position while the value is recorded by the pin. After the recording time has elapsed, relay A is energized to connect the return impulse generator 18 to the backward input 19 of the stepping motor 12 through the contact $a_2$. Thus the stepping motor 12 will receive return impulses from generator 18 and returns the carriage 15 into its initial position. Then the limit switch 21 is closed and the relay A returns to its central position.

After an additional time interval the cycle described is repeated, when the timer 20 again closes the contact $a_1$ through the relay A.

FIG. 2 illustrates a portion 22 (on an enlarged scale) of the graph that is produced. Though the pen member 15, 16 is moved only step-by-step, the steps or increments can be made so small, that in total the appearance of an analog record is obtained, which clearly follows the variation with time of the measured variable. The pen may permanently abut the strip chart. In that case a graph similar to a bar graph is produced. Of course, provision may be made by specific means (not shown), to lift the pen from the strip chart during its advance and return travel and becomes effective only during the recording time proper.

A gear 23 is affixed to the spindle 14, which gear meshes with a gear 24. A spring pawl 25 is mounted on gear 24 and engages a ratchet wheel 26. The ratchet wheel 26 is affixed to the input shaft of a counter 27. By means of the counter 27, the forward impulses occurring during the individual detection periods are summed up. Thereby planimetering of the recorded graph is effected, i.e. a number is obtained which, when taken in conjunction with the movement of the strip chart, represents an integral of the area to one side of the curve. The backward impulses do not effect the total on the counter because of the pawl 25 and the ratchet wheel 26 which serve as a one-way clutch. This type of measured variable integration is of particular interest, apart from the advantage of very low cost, when a linearization by correcting impulses is effected, as will be described hereinbelow with reference to FIGS. 5 through 7. In that event the correcting pulses are also counted during integration, which would not be the case, if the input impulses from line 10 would be fed directly to a counter, in well known manner.

In the basic embodiment of an apparatus of the invention illustrated in FIG. 1, the indicating or pen member is almost always in movement. This is avoided in the modification disclosed schematically in FIG. 4. In FIG. 4 the controls of stepping motor 12, as shown in FIG. 1 (i.e. relay A, generator 18 and timer 20), have been omitted for clarity.

In the embodiment of FIG. 2 the stepping motor 12 controlled by the measuring impulse input does not directly drive the spindle 14 on which the indicating or pen member 15, 16 is mounted. Rather the input shaft 28 of a differential, generally 29, is rotated by the first stepping motor 12. Shaft 28 is connected with one sun gear 30 of the differential. The spindle 14 is connected with the second sun gear 30a. The spindle 14 is rotatable by a second stepping motor 31. The differential has two inputs (gears 30 and 30a) and an output (cage 32). The purpose of the output is to detect and aid in producing an error signal which indicates that the rotational position of output spindle 14 differs from that of input spindle 28.

A contact 33 is rotatable with the cage 32 of the differential 39. This contact 33 is formed by a spiral spring, which permits a continued rotation of the cage 32, after the contact 33 has abutted a cooperating contact. Two opposed, fixed cooperating contacts 34, 35 are provided. These cooperating contacts are connected with the forward and backward inputs 36 and 37, respectively, of the second stepping motor 31. An impulse generator providing an impulse frequency of 200 cycles, for example, is connected with the contact 33, through a slip ring.

When a number of impulses corresponding to the measured variable value is fed to the motor 12 during a given time interval in the manner described in connection with FIG. 1, the input shaft 28 of the differential 29 will be rotated accordingly. The motor 31 remains at first switched off by timer means forming a part of impulse generator 38. The spindle 14 remains stationary. Consequently the cage 32 of the differential rotates. The contact 33 abuts the cooperating contact 34. The continued rotation of the cage is taken up by the spiraling spring.

When the stepping motor 12 has been advanced into a position corresponding to the measured variable value, it remains stationary for a given interval in this position. During that interval the stepping motor 31 is switched on. The stepping motor gets impulses from generator 38 through contact 33 and cooperating contact 34 on the forward input. This causes motor 31 to rotate the spindle 14 to follow the input shaft 28, until the cage 32 is again in its position of rest at which the contacts 33, 34, 35 are opened. Thereby, the pen member 15, 16 has been moved into a position corresponding to the measured variable value and records this value. Through the timer associated with impulse generator 38, the motor 31 is now switched off again. Motor 12 is then connected with its backward input to the return impulse generator and returns to its initial position. Then the forward input of motor 12 is again connected to the measuring impulse input. The motor 12 rotates the input shaft 28 of the differential 29 into a position corresponding to the new measured variable value. During these time intervals, the pen member 15, 16 remains in its previous position.

Now motor 31 is switched on again. If the measured variable has changed in the meantime, the cage 31 is rotated and the contact 33 abuts one of the cooperating contacts 34 or 35. Consequently, the motor 31 gets impulses on its forward or backward input 36 or 37, respectively, and rotates the spindle 14 to follow correspondingly, until the pen member 15, 16 is in the position corresponding to the new measured variable value (as indicated by the position of input shaft 28). The pen member is moved only by a distance corresponding to the difference of the two values. As the recording is effected during the time when the detection of the next following measured variable value takes place, the detection frequency may be selected relatively high, without adversely affecting the clearness of the record.

Instead of one single measured variable, a plurality of measured variables $a$, $b$, $c$ also can be detected cyclically by means of a selector switch 38, as shown in FIG. 4 and can be recorded in the manner described. The pen member 15, 16 carrying a multiple printing head is moved only from one graph $a$, $b$, $c$ on the strip chart 17 to the next one, without having to return to the left into its initial position inbetween.

In the embodiment of FIG. 4, the input shaft 28 of the differential 29 is also formed by a threaded spindle. A carriage 39 engages the threads and is non-rotatably guided in some manner (not shown) to be moved back and forth upon rotation of the spindle. An alarm signal generator 41 is slidable on a bar 40 extending parallel to the spindle 28. If, at a certain measured variable value, the carriage 39 reaches the alarm signal generator, a contact will be closed, whereby, for example, a warning device may be actuated. In order to set the alarm signal generator to a desired value from the outside, an electromagnetically actuated entrainment means 42 in the form of a leaf spring is provided on the carriage, which spring can be drawn down by a magnet. For setting the alarm signal generator, the carriage 39 is moved by the motor 12 to the alarm signal generator. The magnet draws the leaf spring down, so that it engages a slot 43 of the alarm signal generator. If then the carriage is moved further, it takes the alarm signal generator along. In this way, the alarm signal generator may be brought into any desired position. Then the magnet releases the leaf spring and the coupling is opened.

FIG. 5 shows an arrangement, wherein correcting impulses are superimposed onto the measuring impulses for the purpose of linearization or for the purpose of achieving a certain non-linear relation between the indication and the number of measuring impulses.

Figures 6, 7:
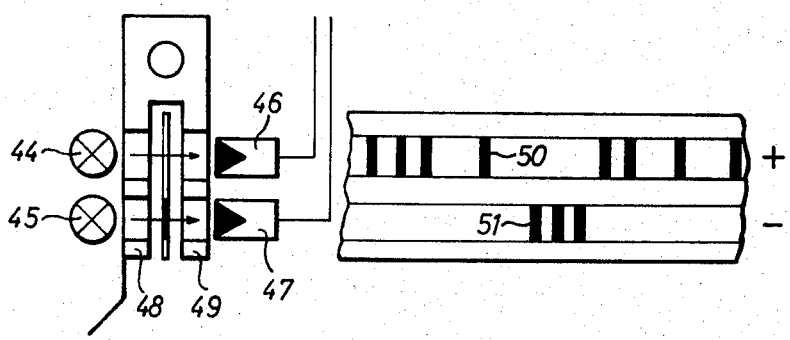
FIG. 6 is a sectional view of the pick-up head.
FIG. 7 shows the two tracks with the marks for producing the correcting impulses.

Numeral 12 again designates the stepping motor rotating the spindle 14 and thereby moving the pen or indicating member composed of the carriage 15 and the pen 16 back and forth. A scanning pick-up head composed of two light barriers with lamps 44, 45 and photodiodes 46, 47 is provided on the carriage 15. The lamps and photodiodes are provided on two side walls 48 and 49 depending from the carriage and apertured (FIG. 6). The side walls extend over two transparent tapes 50, 51 with marks thereon. The transparent tapes extend along the spindle 14. With the carriage passing by, the marks interrupt the light barriers and thereby produce additional correcting impulses, which, through lines 52, 53 and appropriate circuitry 54 additionally actuate the stepping motor 12, the impulses from the upper transparent tape 50 acting additively to the measuring impulses. If, for exampe, fifty measuring impulses arrive, the desired function, however, requires sixty steps, ten additional correcting impulses from the photodiode must be fed to the forward input. The subtractive impulses may be effective to block the next following measuring impulse.

The invention permits various modifications: Instead of a mechanical differential gear as shown in FIG. 4, an equivalent electric arrangement or electronic memory circuit could be provided. Instead of producing the correcting impulses of FIGS. 5 through 7 photoelectrically, they may be produced magnetically such as by a magnetic tape.

I claim:

1. In an indicating device wherein a recording member is moved with respect to a recording medium by a drive including traversing means having an initial position and a power means which includes a stepping motor, said device including a measuring impulse input means connected to the power means and through which impulses are fed to the stepping motor to move the indicating member as a function of the impulses to the stepping motor, the improvement comprising: said input means including a timer and a return impulse generator, said input means connecting the input measuring impulses to the motor to energize the motor for a timed period and thereafter connecting the return impulse generator to the motor to energize the motor to return the motor to its initial position.

2. In a device as set forth in claim 1, wherein said drive includes a rotating threaded spindle, said recording member engaging said spindle for movement therealong as the spindle rotates; and including a counter, and one-way clutch means connecting the spindle and counter.

3. In an indicating device as set forth in claim 1, wherein said drive includes a rotating threaded spindle; said recording member engaging said spindle for movement therealong as the spindle rotates; said input means including a second stepping motor, an input shaft connected to the second motor, differential means including two inputs and an output with one input being connected to said shaft and the other to said spindle, error signal means including said return impulse generator connected to the output to provide an error signal at a preselected time period to the extent that the second input is displaced from the first input at the period to thereby bring the second input into coincidence with the first input, said second motor being connected to receive the measuring impulses.

4. In a device as claimed in claim 3, characterized in that the input shaft is formed as a second spindle, a non-rotatably guided carriage mounted on said second spindle, an alarm signal generator means operatively connected to said carriage to be actuated by a predetermined position of the carriage.

5. In a device as claimed in claim 4, characterized in that the alarm signal generator is movably guided along a path parallel to the spindle, and an electromagnetically actuated entrainment means for moving the alarm signal generator is provided on the carriage.

6. In a device as claimed in claim 1, characterized in that a track with marks is provided along the path of the recording member, and that a pick-up head for scanning these marks is connected with the recording member and the input means to apply a correcting impulse to the measuring impulse input upon detection of each such mark.

7. In a device as claimed in claim 6, characterized in that two tracks and pick-up heads are provided, one track producing additive and the other track subtractive correcting impulses.

8. In a device as set forth in claim 1, wherein said device includes switch means positioned to be actuated in one sense when the traversing means is at the initial position and actuated in a second sense when the traversing means has been moved by the stepping motor away from the initial position, said switch means being operatively connected to the input means to disconnect the motor from the return impulse generator and to connect the measuring impulses to the motor when the traversing means returns to its initial position.

9. In a device as set forth in claim 8, wherein said input means includes a relay having contact means moveable between two positions, at one of which positions the stepping motor is connected to the measuring impulses and at the other of which the stepping motor is connected to the return impulse generator, said switch means being connected to said relay to establish said contact means in said one position when said traversing means returns to the initial position, said timer being connected to said relay to establish said contact means in said other position for said timed period after said traversing means has returned to said initial position.

References Cited

UNITED STATES PATENTS

| | | | |
|---|---|---|---|
| 1,379,528 | 5/1921 | Clark | 346—65 X |
| 2,746,834 | 5/1956 | McLean | 346—113 |
| 3,315,266 | 4/1967 | Lapinski | 346—32 |

RICHARD B. WILKINSON, *Primary Examiner.*

JOSEPH W. HARTARY, *Assistant Examiner.*

U.S. Cl. X.R.

346—17, 30, 139